United States Patent

[11] 3,570,511

| [72] | Inventor | Thomas W. Bermel |
| | | Corning, N.Y. |
| [21] | Appl. No. | 723,398 |
| [22] | Filed | Apr. 23, 1968 |
| [45] | Patented | Mar. 16, 1971 |
| [73] | Assignee | Corning Glass Works |
| | | Corning, N.Y. |

[54] NON-MOVING PART PRESSURE REGULATOR
11 Claims, 4 Drawing Figs.

[52] U.S. Cl. ..................................................... 137/81.5
[51] Int. Cl. ..................................................... F15c 1/12
[50] Field of Search ........................................ 137/81.5;
235/201 (P.f.), (sens., etc.)

[56] References Cited
UNITED STATES PATENTS

| 3,461,897 | 8/1969 | Kwok ............................ | 137/81.5 |
| 3,472,256 | 10/1969 | Hartman ....................... | 137/81.5 |
| 3,155,825 | 11/1964 | Boothe .......................... | 137/81.5X |
| 3,250,469 | 5/1966 | Colston ......................... | 137/81.5X |
| 3,276,689 | 10/1966 | Freeman ....................... | 137/81.5X |
| 3,429,249 | 2/1969 | Furlong ......................... | 137/81.5X |
| 3,442,278 | 5/1969 | Pertersen ...................... | 137/81.5 |
| 3,443,575 | 5/1969 | Hughes .......................... | 137/81.5 |
| 3,452,665 | 7/1969 | Furlong ......................... | 137/81.5X |

*Primary Examiner*—Samuel Scott
*Attorneys*—Clarence R. Patty, Jr., Walter S. Zebrowski and William J. Simmons, Jr.

ABSTRACT: A nonmoving part pressure regulator including a proportional amplifier device having a power stream inlet passage which is adapted to be connected to an unregulated pressure source and one output passage which is adapted to supply a regulated pressure to a load. Linear and nonlinear feedback paths connect the one output passage to two opposed control orifices of the proportional amplifier device.

Patented March 16, 1971 3,570,511

INVENTOR.
Thomas W. Bermel
BY William J. Simmons Jr.
ATTORNEY

NON-MOVING PART PRESSURE REGULATOR

BACKGROUND OF THE INVENTION

Fluid systems are presently being used in such applications as data processing, missile attitude control, automatic pilots, industrial equipment control, and the like. Such systems require sources of regulated pressure to properly function. Fluctuations in pressure from the regulated value may cause errors and may actually damage equipment in the event of a severe overload.

Operating fluid for the aforementioned systems is usually obtained from a high pressure source, lower operating pressures being obtained by pressure regulators. To exhibit such desired characteristics as long life and high reliability, pressure regulators having no moving parts are preferred for use in these systems.

SUMMARY OF THE INVENTION

It is therefore an object of this invention to provide a nonmoving part pressure regulator which exhibits high reliability during extremely long periods of use.

Another object of this invention is to provide a pressure regulator which provides a nearly constant regulated pressure over a wide range of unregulated input pressures.

Still another object of this invention is to provide a pressure regulator which provides a nearly constant regulated pressure over a wide range of load conditions.

A further object of this invention is to provide a pressure regulator which exhibits a rapid readjustment to regulated pressure in response to variations in unregulated input pressure or variations in load conditions.

A further object of this invention is to provide a pressure regulator wherein various values of regulated pressure may be selected.

Briefly, the pressure regulator of this invention comprises a proportional amplifier block having at least a power stream nozzle, first and second control orifices and at least one output passage. First connecting means is provided for connecting the output passage to a load. Second connecting means is provided for connecting the power stream orifice to a source of unregulated pressure. A linear flow resistor is connected between the first connecting means and first control orifice of the fluid amplifier block while a nonlinear flow resistor is connected between the first connecting means and the second control orifice of the fluid amplifier block.

Additional objects, features and advantages of the present invention will become apparent to those skilled in the art from the following detailed description and the attached drawing on which, by way of example, only the preferred embodiment of this invention is illustrated.

BRIEF DESCRIPTION OF THE DRAWING

Referring now to FIG. 1 there is shown a gain block 10 consisting of three cascaded proportional amplifiers 12, 14 and 16. The outlet passages of the amplifier 16 are connected by pipes 18 and 20 to the two control nozzles of a proportional amplifier 22 which is provided to increase the amount of flow available to a load 24 which is connected to one of the outlet passages of the amplifier 22 by a pipe 26. The remaining outlet passage of the amplifier 22 is vented to ambient pressure as indicated at V. The term "pipe" as used herein denotes a pipe, channel, tube, duct, or other suitable means for conveying fluid signals.

Figure 1:
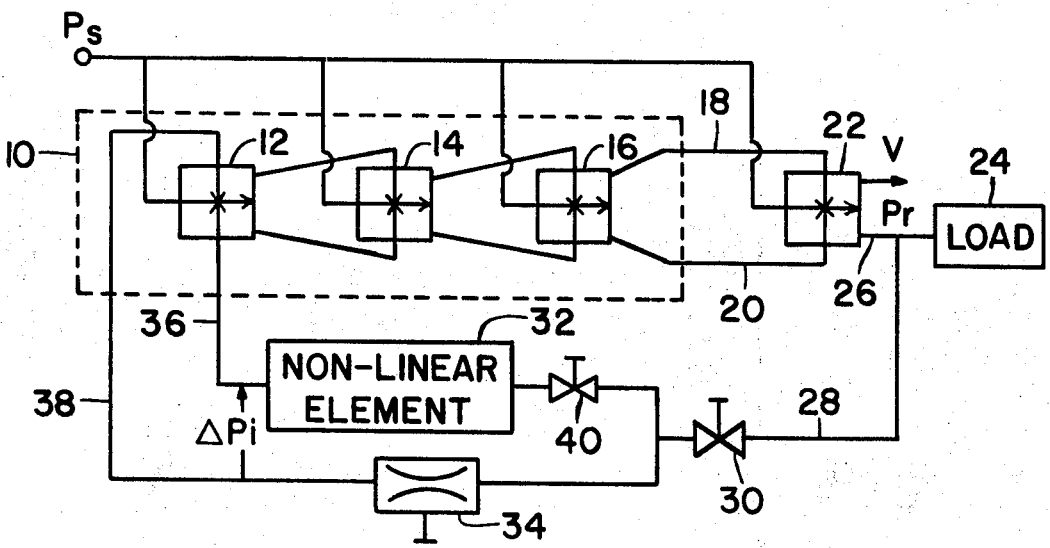
FIG. 1 is a schematic diagram of a pressure regulator in accordance with the present invention.

A source $P_s$ of unregulated pressure is connected to the power stream nozzles of the proportional amplifiers 12, 14, 16 and 22. The pressure $P_r$ existing at the pipe 26 is coupled by a pipe 28 to both a nonlinear resistor element 32 and a linear resistor element 34 which is indicated as being variable. The linear resistor element 34 may consist of a laminar flow restriction, and the nonlinear resistor element 32 may consist of an orifice restriction which offers resistance to fluid flow by means of an orifice or a reduction in the cross-sectional area of the channel through which the fluid flows. A preferred device for use as the nonlinear resistor is a flow diode which is disclosed in U.S. Pat. No. 3,480,030 issued Nov. 25, 1969. The pressure-flow characteristics of this diode are nonlinear up to 15 p.s.i.g., and it exhibits negative resistance characteristics between 20 and 30 p.s.i.g.

A valve 30 connected in the pipe 28 permits a pressure lower than $P_r$ to be supplied to the resistor elements 32 and 34. The nonlinear resistor element 32 is connected by a pipe 36 to one of the control nozzles of the proportional amplifier 12, the linear resistor 34 being connected to the opposite control nozzle of the amplifier 12 by a pipe 38. A valve 40 is connected in series with the nonlinear element 32 to change the gain thereof.

The gain block 10 and the amplifier 22 could be replaced by a single proportional amplifier having a power stream nozzle connected to the unregulated source $P_s$, a pair of opposed control nozzles connected to the pipes 36 and 38, and an outlet passage connected to the pipe 26. However, for reasons to be set forth hereinbelow this simplified version would not be as effective as the system illustrated in FIG. 1 for providing a regulated pressure.

The main problem encountered in the design of a nonmoving part pressure regulator is generating a reference pressure with which all other pressures in the system can be compared. In accordance with this invention, the method utilized to generate the desired reference pressure is based on the flow characteristics of the linear resistor 34 and the nonlinear resistor element 32.

The operation of the pressure regulator illustrated in FIG. 1 will now be described, reference also being made to the graphs of FIGS. 2—4.

Assuming the valves 30 and 40 to be completely open so that the pressure $P_r$ at pipe 26 is applied to the resistor elements 32 and 34, a differential pressure $\Delta P_i$ will exist between the pipes 36 and 38. The curve 42 of FIG. 2 illustrates the differential pressure $\Delta P_i$ as a function of the pressure $P_r$. As the pressure $P_r$ increases from zero, the pressure in pipe 36 will be higher than that in pipe 38 because more flow is passed through the nonlinear element 32 than through the linear resistor 34. The differential pressure $\Delta P_i$ is therefore initially positive. As $P_r$ is increased, the flow in the two resistor elements 32 and 34 becomes equal and produces a zero pressure differential at value of $P_r$ which is equal to R. Thus, the above-mentioned reference pressure is the amount of pressure necessary to equalize the flow in the linear and the nonlinear resistor elements.

As $P_r$ is further increased, the pressure in pipe 38 becomes larger than that in pipe 36 and $\Delta P_i$ becomes negative. It is this region of negative $\Delta P_i$ which is used to regulate the pressure in pipe 26. When the pressure in pipe 28 exceeds point R (FIG. 2) $\Delta P_i$ becomes negative, and this value of $\Delta P_i$ is amplified by the gain block 10. The pressure at pipe 20 is greater than that at line 18 during this condition of negative $\Delta P_i$, and most of the power stream in amplifier 22 is vented. Only that portion of the power stream in amplifier 22 is passed to the pipe 26 which is necessary to maintain the pressure in pipe 26 at the regulated pressure $P_r$.

Between the pressures $P_1$ and $P_2$ the curve 42 has a slope $K_1$ which is illustrated by the line 44. The differential pressure $\Delta P_i$ is zero when the pressure at $P_r$ is equal to R. For any pressure $P_a$ between the limits $P_1$ and $P_2$ the differential pressure $\Delta P_i$ is defined by the following equation: $\Delta P_i = K_1 (R - P_a)$ (1)

Figures 2, 3:
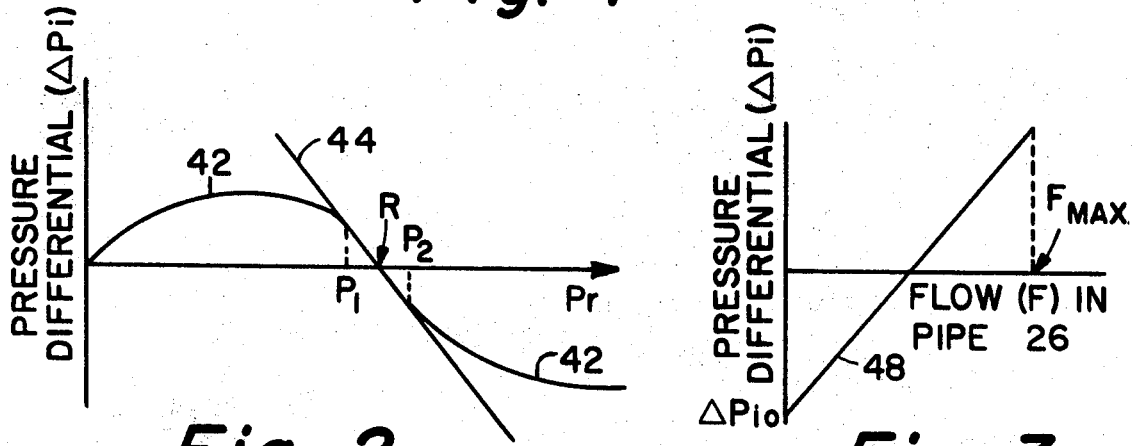
FIG. 2 is a graph which illustrates the differential pressure existing between pipes 36 and 38 of FIG. 1 as a function of the pressure $P_r$ which exists at pipe 26.
FIG. 3 is a graph which illustrates the differential pressure existing between pipes 36 and 38 of FIG. 1 as a function of flow in pipe 26.

The relationship between the flow at the pipe 26 and the differential pressure existing between the pipes 36 and 38 of FIG. 1 is illustrated by the graph in FIG. 3. If the slope of the line 48 is defined as being $K_2$, the differential pressure, $\Delta P_i$ can be defined by the equation: $\Delta P_i = \Delta P_{io} + K_2 F$ (2) where $\Delta P_{io}$ is the pressure differential at the condition of zero flow. This equation is valid for all values of flow less than $F_{max}$, beyond which the relationship between flow and pressure differential is no longer linear.

Since $P_a$ is some value of $P_r$ between $P_1$ and $P_2$, equations (1) and (2) can be combined to provide the following equation:

$$P_r = \frac{-K_2}{K_1} F + \frac{-(\Delta P_{io})}{K_1} + R \quad (3)$$

Therefore, for optimum pressure regulation $K_1$ should be large and $K_2$ should be small. The constant $K_1$ is directly related to the difference in the characteristics of the nonlinear and linear resistances 32 and 34. The constant $K_2$ is inversely related to the power gain of the gain block 10. It is thus seen that although a pressure regulator may be constructed utilizing a single proportional amplifier such as amplifier 22, which may consist of one or more proportional amplifiers, the addition of a gain block substantially improves regulation.

Figure 4:
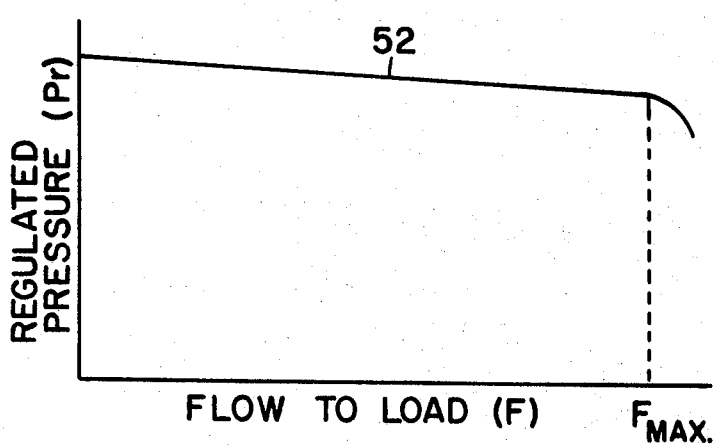
FIG. 4 is a graph which illustrates the pressure at pipe 26 of FIG. 1 as a function of the flow in that pipe.

The curve 52 in FIG. 4 illustrates the relationship between the flow of fluid to the load 24 and the regulated pressure, $P_r$. The curve 52 is substantially linear for values of flow up to the point designated $F_{max}$ beyond which the pressure $P_r$ begins to rapidly decrease. Assuming the slope of the curve 52 to be $K_3$, the regulated pressure can be defined by the following equation: $P_r = (P_r)_F = 0 - K_3 F$ (4)

Comparing this equation with equation (3) it can be seen that $K_3 = K_1/K$. Therefore, the regulated pressure $P_r$ at zero flow to the load can be defined as follows:

$$(P_r) F = 0 = R - \frac{\Delta P_{io}}{K_1} \quad (5)$$

A pressure regulator was constructed in accordance with the schematic diagram of FIG. 1. The resistor 34 was a standard linear resistor, and the nonlinear element 32 was the heretofore described flow diode. With this particular combination of linear and nonlinear elements, a large constant $K_1$ is obtained.

Three methods are provided in FIG. 1 for varying the regulated pressure $P_r$. The first method utilizes the variable linear resistor 34. The resistor 34 may consist of any variable linear resistor such as the linearly variable linear resistor disclosed in U.S. Pat. application Ser. No. 723,387, filed on even date herewith. The same effect could be obtained by substituting different valued linear resistors. A second method of varying the regulated pressure in effect changes the gain of the nonlinear element by inserting a valve 40 in series therewith. A third method is to provide a valve 30 in the pipe 28, thereby reducing the pressure coupled to both of the resistor elements 32 and 34. Each of these methods changes the regulated pressure since each causes a change in the pressure $R$ (see FIG. 2) at which the differential pressure $\Delta P_i$ is zero.

The following results were obtained from the pressure regulator described hereinabove. The regulated pressure variation due to changes in unregulated pressure was ± 2 percent of the regulated pressure with a variation in unregulated pressure between 40 and 95 p.s.i.g. The time response of the system was 0.1 sec. for a change in load and 0.05 sec. for a change in power jet. The regulated pressure was variable from 5 to 45 p.s.i.g. with best performance between 20 and 30 p.s.i.g.

I claim:

1. A fluidic pressure regulator comprising:
   proportional fluid amplifier means having at least a power stream nozzle, first and second control orifices and first and second output passages;
   first connecting means for connecting one of said output passages to a load;
   second connecting means for connecting said power stream nozzle to a source of unregulated pressure;
   a feedback path including a linear flow resistor and a nonlinear flow resistor, a first end terminal of both of said flow resistors being connected to said first connecting means, the second end terminal of said linear flow resistor being connected to the first control orifice of said proportional amplifier means and the second end terminal of said nonlinear flow resistor being connected to the second control orifice of said proportional amplifier means; and
   a differential pressure being developed between said second end terminals of said linear flow resistor and said nonlinear flow resistor in accordance with the absolute pressure in said first connecting means, the effect of said differential pressure on said proportional fluid amplifier means regulating the pressure in said first connecting means.

2. A fluidic pressure regulator in accordance with claim 1 which further includes means in said feedback path for controlling the flow of fluid therethrough, thereby adjusting the regulated pressure appearing at said first connecting means.

3. A fluidic pressure regulator in accordance with claim 1 wherein said linear flow resistor is variable.

4. A fluidic pressure regulator in accordance with claim 1 which further includes means to vary the pressure applied from said first connecting means to both said linear and said nonlinear flow resistors.

5. A fluidic pressure regulator in accordance with claim 1 which further includes means to vary the pressure applied from said first connecting means to said nonlinear flow resistor.

6. A fluidic pressure regulator in accordance with claim 1 wherein said proportional fluid amplifier means comprises:
   a proportional amplifier gain block having at least one power stream nozzle, first and second control orifices and first and second output passages; and
   a second fluid amplifier having a power stream nozzle, first and second control orifices and first and second output passages, the first and second output passages of said proportional amplifier gain block being respectively connected to the first and second control orifices of said second fluid amplifier, said first connecting means being connected to the first output passages of said second fluid amplifier, said second connecting means being connected to the power stream nozzles of said proportional amplifier gain block and said second fluid amplifier, said linear resistor being connected to the first control orifice of said proportional amplifier gain block and said nonlinear flow resistor being connected to the second control orifice of said proportional amplifier gain block.

7. A fluidic pressure regulator in accordance with claim 6 wherein the second output passage of said second fluid amplifier is vented to ambient pressure.

8. A fluidic pressure regulator in accordance with claim 6 which further includes means in said feedback path for controlling the flow of fluid therethrough.

9. A fluidic pressure regulator comprising:
   a proportional amplifier gain block having at least a power stream nozzle, first and second control orifices and first and second output passages;
   a second fluid amplifier having a power stream nozzle, first and second control orifices and first and second output passages, the first and second output passages of said proportional amplifier gain block being respectively connected to the first and second control orifices of said second fluid amplifier, first fluid conductor means for connecting the first output passage of said second fluid amplifier to a load;
   second fluid conductor means for connecting the power stream nozzles of said proportional amplifier gain block and said second fluid amplifier to a source of unregulated pressure;
   a nonlinear flow resistor connected to the first control orifice of said proportional amplifier gain block, a linear flow resistor connected to the first control orifice of said proportional amplifier gain block;

third fluid conductor means connecting both said nonlinear and said linear flow resistors to said first fluid conductor means; and valve means in said third fluid conductor means for controlling the flow of fluid therethrough.

10. A fluidic pressure regulator in accordance with claim 9 wherein said linear flow resistor is variable.

11. A fluidic pressure regulator in accordance with claim 10 which further comprises means in series with said nonlinear flow resistor for decreasing the pressure supplied thereto.

UNITED STATES PATENT OFFICE
CERTIFICATE OF CORRECTION

Patent No. 3,570,511            Dated  March 16, 1971

Inventor(s) Thomas W. Bermel

It is certified that error appears in the above-identified patent and that said Letters Patent are hereby corrected as shown below:

Col. 3, line 34, the equation should read: $K_3 = K_1/K_2$.

Col. 3, line 36, the equation should read:

$$(P_r)_{F=0} = R - \frac{\Delta P_{io}}{K_1}$$

Signed and sealed this 21st day of September 1971.

(SEAL)
Attest:

EDWARD M. FLETCHER, JR.
Attesting Officer

ROBERT GOTTSCHALK
Acting Commissioner of Pate